United States Patent [19]

Nakano et al.

[11] Patent Number: 4,635,596

[45] Date of Patent: Jan. 13, 1987

[54] ASSEMBLY OF PISTON AND CONNECTING ROD IN INTERNAL-COMBUSTION ENGINE

[75] Inventors: Hideaki Nakano, Akashi; Tadahiro Ozu, Kobe, both of Japan

[73] Assignee: Kawasaki Jukogyo Kabushiki Kaisha, Kobe, Japan

[21] Appl. No.: 764,784

[22] Filed: Aug. 12, 1985

[51] Int. Cl.⁴ .................................................. F16J 1/14
[52] U.S. Cl. .......................... 123/197 AB; 123/193 P; 123/197 A; 92/189
[58] Field of Search ........... 123/193 R, 193 P, 197 R, 123/197 A, 197 AB; 92/187, 189–191

[56] References Cited

U.S. PATENT DOCUMENTS 2,069,594 2/1937 Schneider .............................. 92/189
4,269,083 5/1981 Wandel ........................ 123/197 AB
4,372,179 2/1983 Dolenc et al. ................... 123/193 P

*Primary Examiner*—Craig R. Feinberg
*Attorney, Agent, or Firm*—Wenderoth, Lind & Ponack

[57] ABSTRACT

In an internal-combustion engine, a piston pin of each piston is integrally and rigidly fixed to the small end of a connecting rod. The piston pin is pivotally coupled to the piston by way of a metal bearing interposed therebetween, and is held thus in coupled state by bearing caps respectively clamping the ends of the piston pin against the piston over an interposed metal bearing. The greater part of the piston pin is of a large diameter, and its length is only slightly less than the outer diameter of the piston, whereby a practically maximal bearing area is afforded between the piston and piston pin for withstanding forces transmitted therebetween.

5 Claims, 12 Drawing Figures

ASSEMBLY OF PISTON AND CONNECTING ROD IN INTERNAL-COMBUSTION ENGINE

BACKGROUND OF THE INVENTION

This invention relates generally to piston-type internal-combustion engines such as diesel engines and more particularly to an assembly of a piston and connecting rod of improved construction.

The piston and its connecting rod of an internal-combustion engine of the instant piston type are subjected to repeated loads arising from the explosive pressure within the cylinder and from the inertia forces generated during the motions of the piston, its connecting rod, and associated parts and are thus placed under very severe conditions as considered from the viewpoint of mechanical stress.

In a typical known assembly of a piston and its connecting rod, these parts are connected by a wrist pin or piston pin fixed at its opposite ends to the side wall of the piston and pivotally connected at its middle part by way of a bearing metal sleeve to the small end or piston end of the connecting rod. As will be described more fully hereinafter, the end parts of the piston pin in this construction are subject to damage due to the forces mentioned above arising from the repeated explosions and inertia, particularly in high-performance engines. Another problem encountered in this typical piston and connecting rod construction is insufficient load bearing length of the piston pin for withstanding stress on its end parts and on its midportion caused by the above mentioned forces. This problem also will be considered more fully hereinafter.

In another piston and connecting rod construction known in the prior art, a concave spherical seat or socket is formed in the lower part of the piston and is coupled with a convex spherical ball formed at the upper or piston end of the connecting rod. Accordingly, the connecting rod during operation undergoes angular displacement about the centerline of the piston, whereby sticking of the piston rings and scuffing of the sliding surfaces are prevented. In this assembly, however, the concave spherical socket of the piston and the convex ball part of the connecting rod undergo mutual sliding movement while being in a state of direct frictional contact under high surface pressure. Moreover, the lubrication condition is poor. Consequently, the abrasive wear is severe, and seizure readily occurs.

Furthermore, the fabrication of the concave spherical socket and the ball of the connecting rod is troublesome. Even if a bearing were to be provided between these spherical parts, the fabrication of the bearing itself would be difficult, and it would further be difficult to machine the bearing metal of the bearing so that it would be in intimately close and complete contact with concave and convex spherical surfaces of the socket of the piston and ball of the connecting rod. If such an intimate contact cannot be attained, the bearing would be subjected to a repeated load due to the cylinder explosion pressure and inertia force. As a consequence, for example, fretting corrosion would occur between the spherical socket of the piston and the convex spherical surface of the bearing metal or between the concave spherical surface of the bearing metal and the ball surface of the connecting rod and may give rise to damaging of the piston.

To summarize, these piston and connecting rod coupling arrangements of the prior art are inadequate in reliability for engines of high output.

SUMMARY OF THE INVENTION

It is an object of this invention to provide a piston and connecting rod assembly of an internal combustion engine of the piston type in which the above described problems encountered in the prior art are solved, and its reliability is remarkably improved.

According to this invention, briefly summarized, there is provided an assembly of a piston and a connecting rod in an internal-combustion engine comprising: a piston pin joined at its midpoint integrally and rigidly to an end of the connecting rod so as to form a pair of laterally extending piston pin portions; a pair of bearing caps respectively clamping the piston pin portions against the piston in a manner to pivotally couple the piston pin to the piston; a metal bearing piece interposed between the piston pin and metal the piston; and bearing halves interposed between the piston pin portions and the bearing caps, respectively, whereby the piston pin can be made of a practically maximal diameter and extend over a practically maximal distance diametrically across the piston so that a large bearing area is afforded between the piston and the piston pin for withstanding forces transmitted therebetween.

The nature, utility, and further features of this invention will be more clearly apparent from the following detailed description when read in conjunction with the accompanying drawings, briefly described below.

DETAILED DESCRIPTION OF THE INVENTION

Throughout the following description, terms indicative of direction such as "upper", "lower", "above", "below", "top", and "bottom" are based on those applicable to the piston and connecting rod assembly as viewed in FIGS. 1 and 2, for example. That is, "downward" indicates the direction toward the crankshaft.

As conducive to a full understanding of this invention, the general nature, attendant problems, and limitations of a typical example of the conventional piston and connecting rod assembly will first be described with reference to FIGS. 10, 11A, and 11B.

Figure 10:
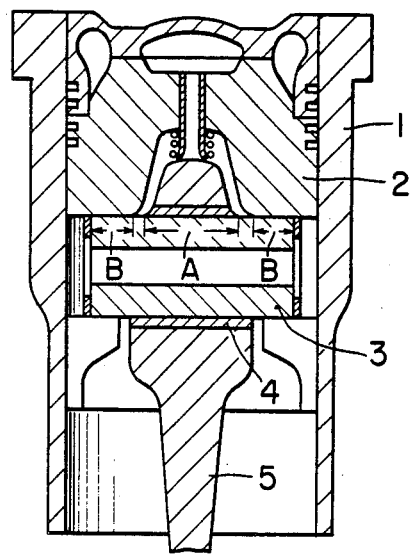
FIG. 10 is a partial view similar to FIGS. 1, 6, and 9 showing an assembly of a piston, piston pin, and connecting rod of a construction known in the prior art.

A vertical cylinder represented by a cylinder liner 1 in FIG. 10 accommodates a piston 2, in which is inserted and fixed a wrist pin or piston pin 3 pivotally connected by way of a metal bearing 4 to the piston end of a connecting rod 5.

Figure 11A:
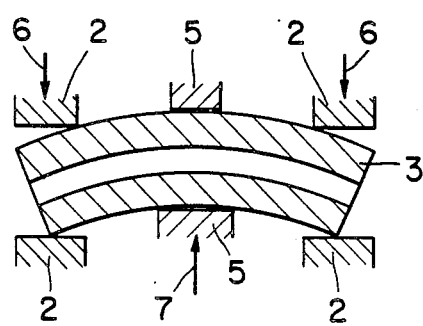
FIGS. 11A and 11B are schematic diagrams indicating modes of loading and bending to which the piston pin shown in FIG. 10 is subjected.
Figure 11B:
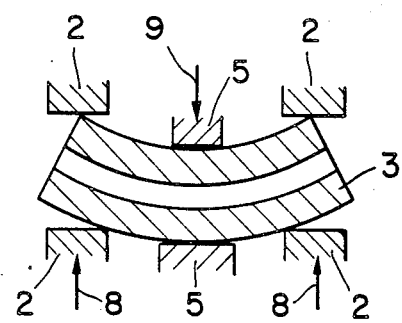

At the time of an explosion in the cylinder combustion chamber of a typical conventional engine, a force as indicated by reference numerals 6, 6 in FIG. 11A acts toward the crankshaft on the piston 2, from which this force is transmitted to the opposite ends of the piston pin 3 and hence to the connecting rod 5. Consequently, the connecting rod 5 exerts a reaction force 7 on the piston pin 3 at its middle part. These forces 6, 6 and 7 on the piston pin 3 cause it to bend as indicated exaggeratedly in FIG. 11A. Furthermore, at the top dead-center position of the piston 2 and the connecting rod 5 during their motion, the piston 2 exerts a force 8, 8 due to inertia force, away from the crankshaft, on the opposite ends of the piston pin 3, counter to which a reaction force 9 is exerted by the connecting rod 5 on the middle part of the piston pin 3. These forces 8, 8 and 9 on the piston pin 3 cause it to deflect as indicated exaggeratedly in FIG. 11B. As a consequence of the above described forces on the piston pin 3 and its resultant deflection, its boss parts at which it is fixedly supported are subject to damage.

A piston pin 3 cannot be made limitlessly large because of restriction imposed by the dimensions of the piston 2. Consequently, the stresses to which a piston pin 3 is subjected increases with rise in the explosion pressure and with increase in the inertia force at the time of high-speed rotation of the engine. The above mentioned reaction force 9 due to the inertia force 8 is imparted by way of the metal bearing 4 to the piston pin 3 at its middle part over a distance A in the axial direction thereof. For a great force 9, an amply long distance A is necessary. Consequently, the remaining length $B+B=2 \cdot B$ of the piston pin 3 fixed to the piston 2 cannot be made amply long. Therefore, the surface pressure on the part of the piston pin 3 over the length $2 \cdot B$ becomes high.

This invention, which overcomes the above described problem as well as the aforedescribed problems, will now be described in detail with respect to certain preferred embodiments thereof.

Figure 1:
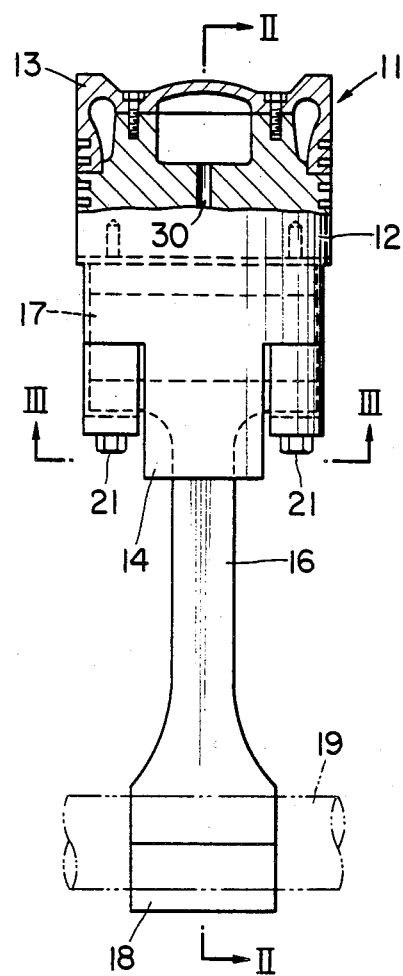
FIG. 1 is a side view in a direction perpendicular to the crankshaft of an engine, with a part cut away, showing the piston, piston pin, and connecting rod of one example of an assembly according to the invention.
Figure 2:
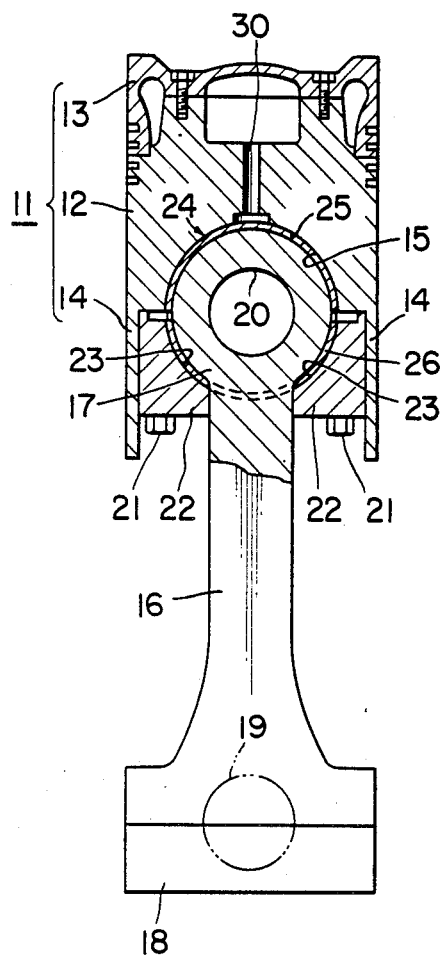
FIG. 2 is a section taken along a plane indicated by line II—II in FIG. 1 as viewed in the arrow direction.
Figure 3:
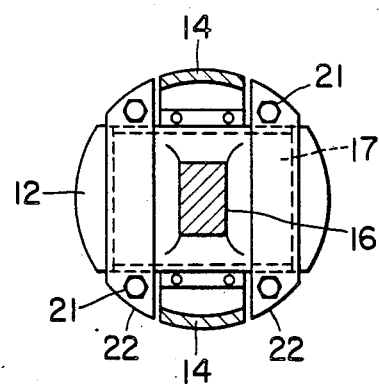
FIG. 3 is a view, partly in cross section, taken along a plane indicated by line III—III in FIG. 1 as viewed in the arrow direction.
Figure 4:
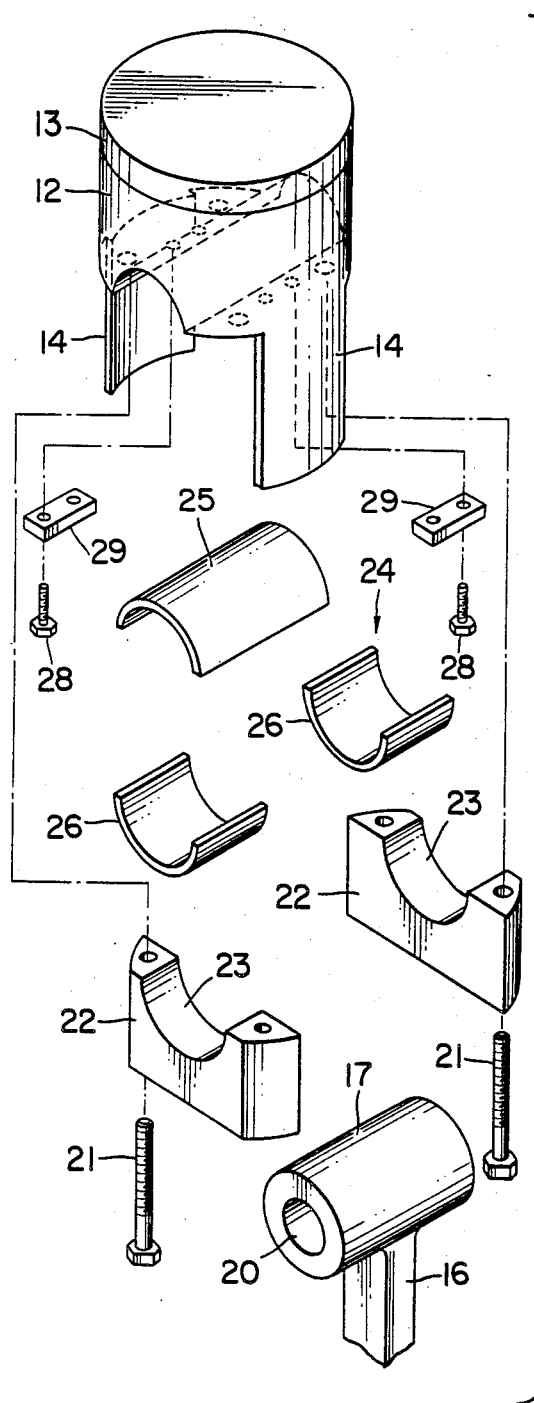
FIG. 4 is an exploded perspective view showing the essential parts of the assembly illustrated in the preceding figures.

Referring first to FIGS. 1 through 5, the piston 11 shown therein has a skirt 12 constituting a trunk part, a crown 13 fixed to the top part of the skirt 12, and a pair of extensions 14, 14 formed integrally with the skirt 12 on the end thereof opposite from the crown 13 (i.e., the lower end of the skirt 12 as viewed in FIGS. 1, 2, and 4). The extensions 14, 14 extend downward from the lower rim of the skirt 12 at respectively diametrically opposed positions thereof and, in cross section, are of arcuate shape, their outer surfaces being coincident with the downward extension of the outer cylindrical surface of the skirt 12.

The skirt 12 at its central part is provided with a bearing recess 15 of concave semicylindrical shape with a horizontal centerline which intersects the vertical centerline of the cylinder skirt 12 and is parallel to the axis of rotation of the crankshaft. Thus, the recess 15 is between the extensions 14, 14 and has a semicircular shape in a plane perpendicular to the crankshaft. Into this bearing recess 15, an upper metal bearing 25 of a corresponding semicylindrical shape is inserted and fitted.

A connecting rod 16 at its piston end has a piston pin 17 formed integrally therewith and extending perpendicularly thereto and parallel to the crankshaft to form a Tee-shaped piston end of the connecting rod 16. The other or crankshaft end of this connecting rod 16 is coupled by way of metal bearing halves (not shown) to a crankpin 19 and held in place by a bearing cap 18 in the known manner. The connecting rod 16 and the piston pin 17 may be formed integrally by processes such as forging and machining, or they may be integrally formed from initially separate parts by joining by means of bolts or by some other method such as welding.

The piston pin 17 is provided with a coaxial through hole 20 for weight reduqtion. In assembled state, the upper half of the surface of the piston pin 17 is fitted snugly against the concave surface of the above described upper metal bearing 25 and is thus held by lower metal bearing halves 26, 26. The lower metal bearing halves 26, 26 are in turn held in respective semicylindrical bearing recesses 23, 23 formed in bearing caps 22, 22 fixed by bolts 21 to the piston skirt 12 on opposite sides of the shank of the connecting rod 16. The metal bearing halves 26, 26 and 25 constitute a sliding shaft bearing 24, which is in bearing contact with the surface of the piston pin 17.

Figure 5:
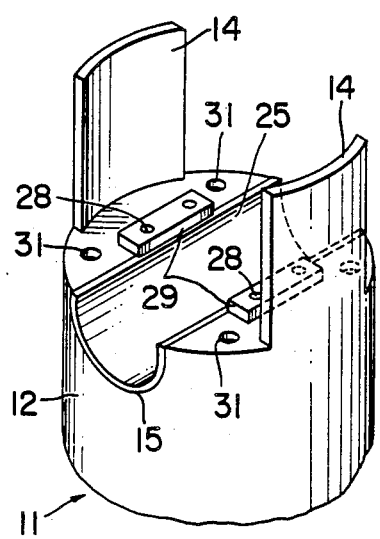
FIG. 5 is a partial perspective view of the piston of the same assembly in inverted state, showing the bottom of the piston skirt with its upper concave bearing recess and upper metal bearing fitted therein.

As shown in FIG. 5, which is a perspective view of the piston skirt 12 and related parts in an inverted state, the upper metal bearing 25 is fixed in place against the bearing recess 15 formed in the skirt 12 by edge parts of a pair of fixing plates 29, 29 in contact respectively with the opposite longitudinal rims of the metal bearing 25. The fixing plates 29, 29 are in turn fixed to the skirt 12 by screws 28. The bearing 24 is supplied with lubricating oil through an oil passage 30 (FIGS. 1 and 2) in a manner well known in the art. FIG. 5 also shows tapped holes 31 into which the the bolts 21 are screwed to fix the bearing caps 22, 22 as described hereinbefore.

An important feature of the above described embodiment of this invention is the integral construction of the connecting rod 16 and the piston pin 17, which is of maximal diameter and length, within practical limits, and is coupled by way of the metal bearing halves 25 and 26, 26 to the skirt 12 of the piston 11, these parts being fixedly held in the assembled state by the bearing caps 22, 22 and the bolts 21. It will be noted that this constructional arrangement provides large bearing surfaces for withstanding repeated loads due to the engine explosions and inertia forces and therefore provides great strength relative to these loads.

Figure 6:
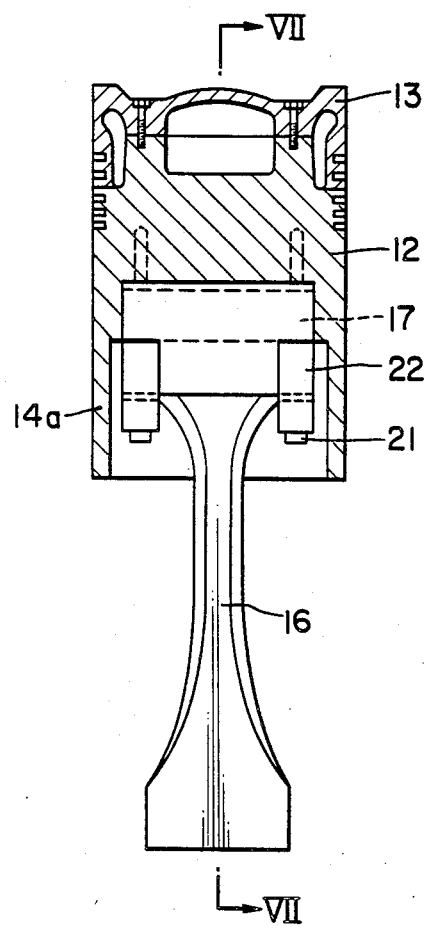
FIG. 6 is a view similar to FIG. 1 showing another form of the assembly of the invention.
Figure 7:
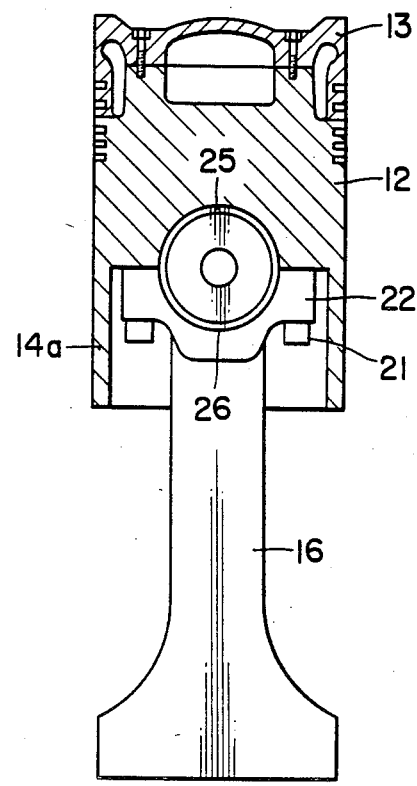
FIG. 7 is a section taken along the plane indicated by line VII—VII in FIG. 6 as viewed in the arrow direction.

Another embodiment of this invention is illustrated in FIGS. 6 and 7, in which those parts which are similar to corresponding parts in the preceding embodiment are designated by like reference numerals. In this embodiment, the extension 14a contiguously extending downward from the skirt 12 of the piston is formed as a full hollow cylinder coaxially with the skirt 12.

Figure 8:
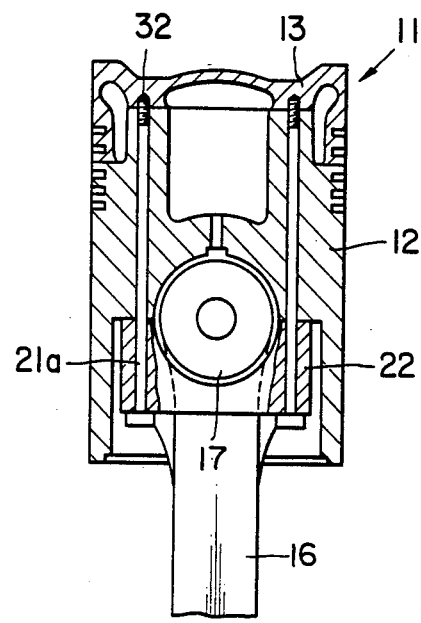
FIG. 8 is a partial view similar to FIGS. 2 and 7 showing still another form of the assembly of the invention.

In still another embodiment of the invention as shown in FIG. 8, the construction is similar to that of the embodiment illustrated in FIGS. 6 and 7. A notable feature of this embodiment is that the skirt 12 of the piston 11 is made of a metal such as an aluminum alloy in order to reduce its weight, and the crown 13 and the bearing caps 22, 22 are made of steel. Bolts 21a for fixedly holding together the assembly are passed through the bearing caps 22, 22 and the skirt 12 and are screwed into tapped holes 32 in the crown 13.

Figure 9:
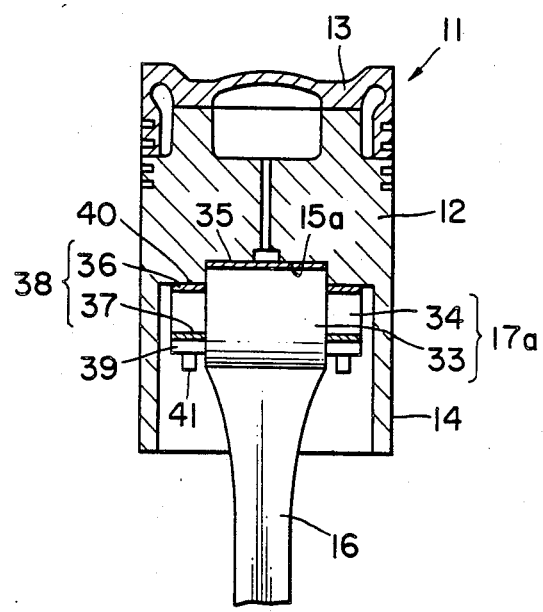
FIG. 9 is a partial view similar to FIGS. 1 and 6 showing a further form of the assembly of the invention.

FIG. 9 illustrates a further embodiment of this invention. This assembly is similar to that described hereinbefore and shown in FIGS. 1 through 5. A noteworthy feature of this construction is that the piston pin 17a integrally formed with the connecting rod 16 comprises a large-diameter midportion 33 contiguous to the piston end of the connecting rod 16 and a support shaft or trunnion part 34 extending outward from and coaxially with the opposite ends of the large-diameter part 33. The upper half of the large-diameter part 33 is rotatably supported by a semicylindrical metal bearing 35, which in turn is backed by a bearing recess 15a formed in the piston skirt 12. The trunnion part 34 is rotatably supported between semicylindrical upper metal bearing halves 36 and semicylindrical lower metal bearing halves 37, which constitute bearings 38 and are respectively fitted in bearing recesses 40 in the skirt 12 and in bearing caps 39 fixedly held against the skirt by bolts 41. By this constructional arrangement, since the trunnion part 34 is of relatively small diameter, the bearing caps 39 can be fixed to the skirt 12 by the use of relatively large bolts 41.

From the foregoing disclosure, it will have been apparent that an outstanding feature of the piston and connecting rod assembly is the forming of the piston pin and the connecting rod as an integral structure, which by its geometrical nature affords a strong coupling between the piston end of the connecting rod and the piston skirt by way of metal bearing halves of practically maximal bearing areas. Accordingly, this construction results in high strength of the essential parts, particularly the bearing parts, for withstanding the loads due to combustion explosion of the engine and inertia forces, whereby the reliability of these parts against failure is improved. Furthermore, because of the increased strength, improvements in certain items of performance are afforded. For example, the effective pressure due to combustion within the cylinder can be raised thereby to reduce the fuel consumption of the internal-combustion engine, and/or the rotational speed of the engine at rated power can be increased thereby to increase the output.

What is claimed is:

1. An assembly of a piston and a connecting rod in an internal-combustion engine comprising:
   a generally cylindrical piston pin;
   a connecting rod integrally formed with and extending from only a lower surface of said piston pin at a point midway between either end of said piston pin;
   a piston having a skirt and a crown disposed on an upper surface of said skirt, said skirt having a concave bearing recess of semicylindrical shape on a lower surface thereof, said recess having a length at least equal so that of said piston pin;
   a metal bearing piece of semicylindrical shape disposed in said concave bearing recess across the entire length thereof, an upper half of said piston pin being held in a semicylindrical recess defined by said metal bearing piece;
   a pair of spaced metal bearing halves of semicylindrical shape disposed, respectively, over a lower half of said piston pin on either side of said connecting rod;
   a pair of bearing caps, each of said bearing caps having a concave bearing recess, each of said bearing caps being fitted over one of said metal bearing halves to pivotally couple said piston pin to said piston; and
   bolt means fixedly attaching said pair of bearing caps to said skirt of said piston.

2. The assembly of claim 1, wherein said piston pin has a central portion of large diameter with each opposite end portion of said piston pin forming trunnion parts of smaller diameter, said lower surface of said skirt having concave semicylindrical bearing recesses for said trunnion parts and said central portion of said piston pin, each of said bearing recesses having a metal bearing piece interposed between said piston pin and each of said bearing recesses, said trunnion parts being pivotally coupled to said piston by said pair of metal bearing halves and said pair of bearing caps.

3. The assembly of claim 1, wherein a pair of extensions extend from said lower surface of said skirt on either side of said concave bearing recess.

4. The assembly of claim 1, further comprising fixing plate means disposed on said lower surface of said skirt for preventing movement of said metal bearing piece.

5. The assembly of claim 4, wherein said fixing plate means comprises fixing plates which are secured to said lower surface of said skirt with a portion of each fixing plate extending inwardly over said concave bearing recess and said metal bearing piece has a pair of parallel edges which contact the portions of said fixing plates extending inwardly over said concave bearing recess.

* * * * *